United States Patent
Yang et al.

(10) Patent No.: US 9,456,399 B2
(45) Date of Patent: Sep. 27, 2016

(54) CIRCUIT SWITCHED FALL BACK REDIRECTION ACROSS MOBILE SWITCHING CENTER POOLS

(71) Applicant: QUALCOMM Incorporated, San Diego, CA (US)

(72) Inventors: Ming Yang, San Diego, CA (US); Tom Chin, San Diego, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 0 days.

(21) Appl. No.: 14/465,455

(22) Filed: Aug. 21, 2014

(65) Prior Publication Data

US 2016/0057682 A1    Feb. 25, 2016

(51) Int. Cl.
  *H04W 36/24* (2009.01)
  *H04W 36/32* (2009.01)
  *H04W 36/00* (2009.01)
  *H04W 88/06* (2009.01)

(52) U.S. Cl.
  CPC ......... *H04W 36/24* (2013.01); *H04W 36/0066* (2013.01); *H04W 36/32* (2013.01); *H04W 36/0016* (2013.01); *H04W 36/0022* (2013.01); *H04W 88/06* (2013.01)

(58) Field of Classification Search
  None
  See application file for complete search history.

(56) References Cited

U.S. PATENT DOCUMENTS

| | | | | |
|---|---|---|---|---|
| 7,389,109 B2 * | 6/2008 | Hind | ...................... | H04W 48/18 455/432.1 |
| 8,644,841 B1 * | 2/2014 | Oroskar | ................ | H04W 28/08 455/442 |
| 2010/0311386 A1 * | 12/2010 | Edge | ................. | H04W 36/0022 455/404.1 |
| 2010/0331011 A1 | 12/2010 | Vikberg et al. | | |
| 2011/0090872 A1 | 4/2011 | Dahlen et al. | | |
| 2011/0183647 A1 * | 7/2011 | Dalsgaard | ............ | H04J 11/0093 455/411 |
| 2013/0070728 A1 * | 3/2013 | Umatt | ............... | H04W 36/0022 370/331 |
| 2013/0235805 A1 | 9/2013 | Yang et al. | | |
| 2013/0265884 A1 | 10/2013 | Brombal et al. | | |
| 2014/0038614 A1 | 2/2014 | Diachina et al. | | |
| 2014/0113636 A1 | 4/2014 | Lee et al. | | |

(Continued)

FOREIGN PATENT DOCUMENTS

| | | | |
|---|---|---|---|
| WO | 2014047852 A1 | 4/2014 | |
| WO | 2014107054 A1 | 7/2014 | |
| WO | WO2014-107054 | * 7/2014 | ............ H04W 48/18 |

OTHER PUBLICATIONS

International Search Report and Written Opinion—PCT/US2015/042973—ISA/EPO—Oct. 28, 2015.

*Primary Examiner* — Leon-Viet Nguyen
(74) *Attorney, Agent, or Firm* — Seyfarth Shaw LLP

(57) ABSTRACT

A user equipment (UE) receives a circuit switched page from a first radio access technology (RAT) and a command instructing the UE to redirect to a second RAT. The command indicates a designated location area identity of the second RAT. The UE detects base stations of the second RAT and determines whether a strongest base station is in an area identified by the designated location area identity. The UE connects to the strongest base station based on the determining. When the designated location area identity is a permitted location area, the UE connects to the strongest base station when the location of the strongest base station is included in the permitted location area. When the designated location area identity is a prohibited location area, the UE connects to the strongest base station when the location of the strongest base station is not included in the prohibited location area.

20 Claims, 10 Drawing Sheets

(56) References Cited

U.S. PATENT DOCUMENTS

2014/0349693 A1* 11/2014 Kim ..................... H04W 48/20 455/500

2015/0208293 A1 7/2015 Zhang et al.
2015/0264620 A1* 9/2015 Timus ................... H04W 36/32 455/440

* cited by examiner

CIRCUIT SWITCHED FALL BACK REDIRECTION ACROSS MOBILE SWITCHING CENTER POOLS

BACKGROUND

1. Field

Aspects of the present disclosure relate generally to wireless communication systems, and more particularly, to circuit switched fall back redirection across mobile switching center (MSC) pools.

2. Background

Wireless communication networks are widely deployed to provide various communication services such as telephony, video, data, messaging, broadcasts, and so on. Such networks, which are usually multiple access networks, support communications for multiple users by sharing the available network resources. One example of such a network is the Universal Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). The UMTS, which is the successor to Global System for Mobile Communications (GSM) technologies, currently supports various air interface standards, such as Wideband-Code Division Multiple Access (W-CDMA), Time Division-Code Division Multiple Access (TD-CDMA), and Time Division-Synchronous Code Division Multiple Access (TD-SCDMA). For example, China is pursuing TD-SCDMA as the underlying air interface in the UTRAN architecture with its existing GSM infrastructure as the core network. The UMTS also supports enhanced 3G data communications protocols, such as High Speed Packet Access (HSPA), which provides higher data transfer speeds and capacity to associated UMTS networks. HSPA is a collection of two mobile telephony protocols, High Speed Downlink Packet Access (HSDPA) and High Speed Uplink Packet Access (HSUPA) that extends and improves the performance of existing wideband protocols.

As the demand for mobile broadband access continues to increase, research and development continue to advance the UMTS technologies not only to meet the growing demand for mobile broadband access, but to advance and enhance the user experience with mobile communications.

SUMMARY

According to one aspect of the present disclosure, a method for wireless communication includes receiving circuit switched (CS) paging from a first radio access technology (RAT). The method also includes receiving a command from the first RAT to redirect to a second RAT. The command includes an indication of one or more designated location area identities of the second RAT. The method also includes detecting multiple base stations of the second RAT. The method further includes determining whether a location area of a first strongest base station of the multiple base stations is included in the one or more designated location area identities. The method further includes connecting to the first strongest base station based on the determining.

According to another aspect of the present disclosure, a method for wireless communication includes sending circuit switched (CS) paging to a user equipment (UE) from a base station of a first radio access technology (RAT). The method may also include sending a command to the UE to redirect to a second RAT. The command includes an indication of one or more designated location area identities of the second RAT.

According to another aspect of the present disclosure, an apparatus for wireless communication includes means for receiving circuit switched (CS) paging from a first radio access technology (RAT). The apparatus also includes means for receiving a command from the first RAT to redirect to a second RAT. The command includes an indication of one or more designated location area identities of the second RAT. The apparatus also includes means for detecting multiple base stations of the second RAT. The apparatus further includes means for determining whether a location area of a first strongest base station of the multiple base stations is included in the one or more designated location area identities. The apparatus further includes means for connecting to the first strongest base station based on the determining.

According to another aspect of the present disclosure, an apparatus for wireless communication includes means for sending circuit switched (CS) paging to a user equipment (UE) from a base station of a first radio access technology (RAT). The apparatus may also include means for sending a command to the UE to redirect to a second RAT. The command includes an indication of one or more designated location area identities of the second RAT.

Another aspect discloses a computer program product for wireless communications in a wireless network having a non-transitory computer-readable medium. The computer readable medium has non-transitory program code recorded thereon which, when executed by the processor(s), causes the processor(s) to perform an operation of receiving circuit switched (CS) paging from a first radio access technology (RAT). The program code also causes the processor(s) to receive a command from the first RAT to redirect to a second RAT. The command includes an indication of one or more designated location area identities of the second RAT. The program code also causes the processor(s) to detect multiple base stations of the second RAT. The program code further causes the processor(s) to determine whether a location area of a first strongest base station of the multiple base stations is included in the one or more designated location area identities. The program code further causes the processor(s) to connect to the first strongest base station based on the determining.

Another aspect discloses a computer program product for wireless communications in a wireless network having a non-transitory computer-readable medium. The computer readable medium has non-transitory program code recorded thereon which, when executed by the processor(s), causes the processor(s) to perform an operation of sending circuit switched (CS) paging to a user equipment (UE) from a base station of a first radio access technology (RAT). The program code also causes the processor(s) to send a command to the UE to redirect to a second RAT. The command includes an indication of one or more designated location area identities of the second RAT.

Another aspect discloses an apparatus for wireless communication and includes a memory and at least one processor coupled to the memory. The processor(s) is configured to receive circuit switched (CS) paging from a first radio access technology (RAT). The processor(s) is also configured to receive a command from the first RAT to redirect to a second RAT. The command includes an indication of one or more designated location area identities of the second RAT. The processor(s) is also configured to detect multiple base stations of the second RAT. The processor(s) is further configured to determine whether a location area of a first strongest base station of the multiple base stations is included in the one or more designated location area identities. The processor(s) is further configured to connect to the first strongest base station based on the determining.

Another aspect discloses an apparatus for wireless communication and includes a memory and at least one processor coupled to the memory. The processor(s) is configured to send circuit switched (CS) paging to a user equipment (UE) from a base station of a first radio access technology (RAT). The processor(s) is also configured to send a command to the UE to redirect to a second RAT. The command includes an indication of one or more designated location area identities of the second RAT.

This has outlined, rather broadly, the features and technical advantages of the present disclosure in order that the detailed description that follows may be better understood. Additional features and advantages of the disclosure will be described below. It should be appreciated by those skilled in the art that this disclosure may be readily utilized as a basis for modifying or designing other structures for carrying out the same purposes of the present disclosure. It should also be realized by those skilled in the art that such equivalent constructions do not depart from the teachings of the disclosure as set forth in the appended claims. The novel features, which are believed to be characteristic of the disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout.

DETAILED DESCRIPTION

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

Figure 1:
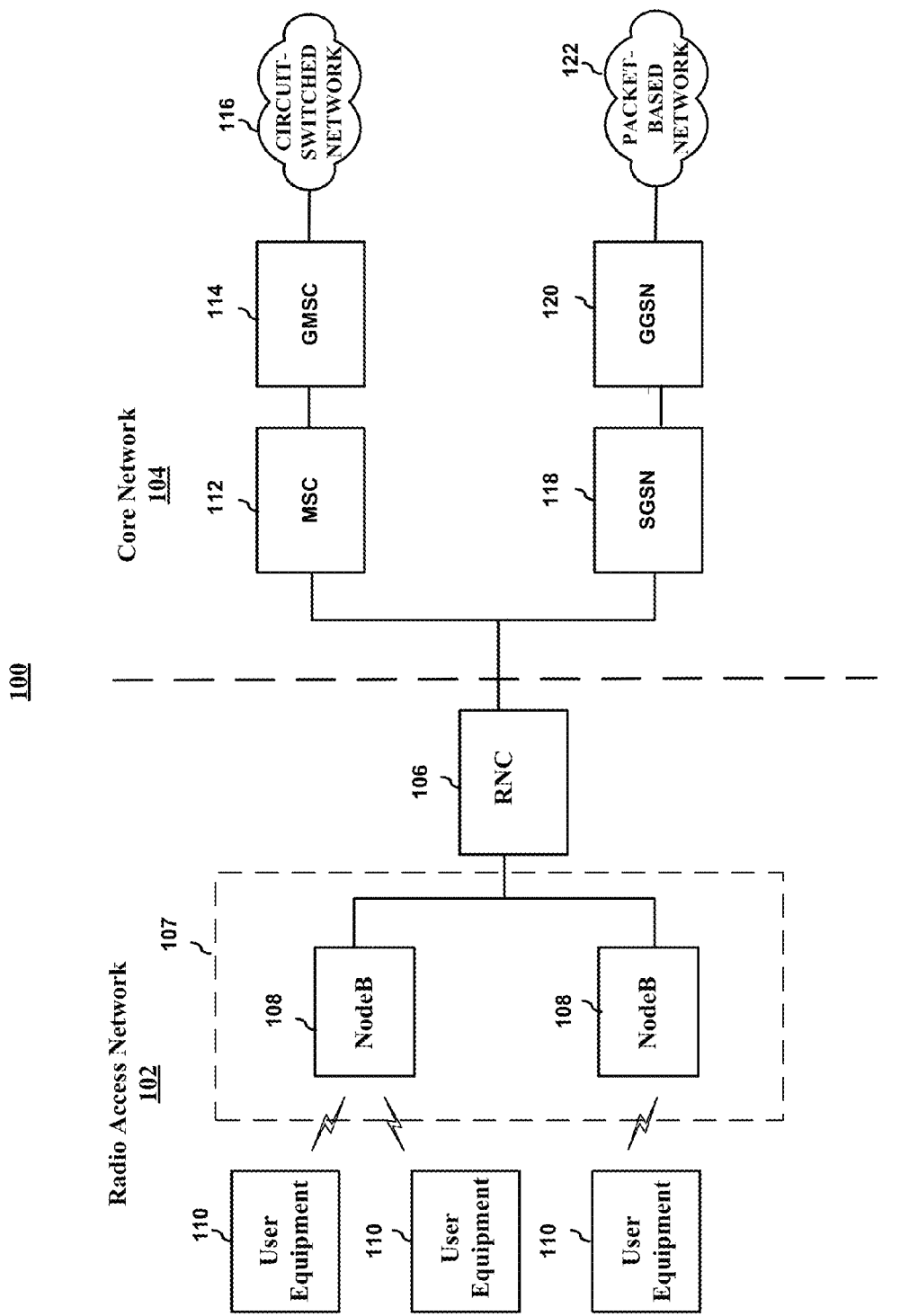
FIG. 1 is a block diagram conceptually illustrating an example of a telecommunications system.

Turning now to FIG. 1, a block diagram is shown illustrating an example of a telecommunications system 100. The various concepts presented throughout this disclosure may be implemented across a broad variety of telecommunication systems, network architectures, and communication standards. By way of example and without limitation, the aspects of the present disclosure illustrated in FIG. 1 are presented with reference to a UMTS system employing a TD-SCDMA standard. In this example, the UMTS system includes a (radio access network) RAN 102 (e.g., UTRAN) that provides various wireless services including telephony, video, data, messaging, broadcasts, and/or other services. The RAN 102 may be divided into a number of Radio Network Subsystems (RNSs) such as an RNS 107, each controlled by a Radio Network Controller (RNC) such as an RNC 106. For clarity, only the RNC 106 and the RNS 107 are shown; however, the RAN 102 may include any number of RNCs and RNSs in addition to the RNC 106 and RNS 107. The RNC 106 is an apparatus responsible for, among other things, assigning, reconfiguring and releasing radio resources within the RNS 107. The RNC 106 may be interconnected to other RNCs (not shown) in the RAN 102 through various types of interfaces such as a direct physical connection, a virtual network, or the like, using any suitable transport network.

The geographic region covered by the RNS 107 may be divided into a number of cells, with a radio transceiver apparatus serving each cell. A radio transceiver apparatus is commonly referred to as a node B in UMTS applications, but may also be referred to by those skilled in the art as a base station (BS), a base transceiver station (BTS), a radio base station, a radio transceiver, a transceiver function, a basic service set (BSS), an extended service set (ESS), an access point (AP), or some other suitable terminology. For clarity, two node Bs 108 are shown; however, the RNS 107 may include any number of wireless node Bs. The node Bs 108 provide wireless access points to a core network 104 for any number of mobile apparatuses. Examples of a mobile apparatus include a cellular phone, a smart phone, a session initiation protocol (SIP) phone, a laptop, a notebook, a netbook, a smartbook, a personal digital assistant (PDA), a satellite radio, a global positioning system (GPS) device, a multimedia device, a video device, a digital audio player (e.g., MP3 player), a camera, a game console, or any other similar functioning device. The mobile apparatus is commonly referred to as user equipment (UE) in UMTS applications, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. For illustrative purposes, three UEs 110 are shown in communication with the node Bs 108. The downlink (DL), also called the forward link, refers to the communication link from a node B to a UE, and the uplink (UL), also called the reverse link, refers to the communication link from a UE to a node B.

The core network 104, as shown, includes a GSM core network. However, as those skilled in the art will recognize, the various concepts presented throughout this disclosure may be implemented in a RAN, or other suitable access network, to provide UEs with access to types of core networks other than GSM networks.

In this example, the core network 104 supports circuit-switched services with a mobile switching center (MSC) 112 and a gateway MSC (GMSC) 114. One or more RNCs, such as the RNC 106, may be connected to the MSC 112. The MSC 112 is an apparatus that controls call setup, call routing, and UE mobility functions. The MSC 112 also includes a visitor location register (VLR) (not shown) that contains subscriber-related information for the duration that a UE is in the coverage area of the MSC 112. The GMSC 114 provides a gateway through the MSC 112 for the UE to access a circuit-switched network 116. The GMSC 114 includes a home location register (HLR) (not shown) containing subscriber data, such as the data reflecting the details of the services to which a particular user has subscribed. The HLR is also associated with an authentication center (AuC) that contains subscriber-specific authentication data. When a call is received for a particular UE, the GMSC 114 queries the HLR to determine the UE's location and forwards the call to the particular MSC serving that location.

The core network 104 also supports packet-data services with a serving GPRS support node (SGSN) 118 and a gateway GPRS support node (GGSN) 120. GPRS, which stands for General Packet Radio Service, is designed to provide packet-data services at speeds higher than those available with standard GSM circuit-switched data services. The GGSN 120 provides a connection for the RAN 102 to a packet-based network 122. The packet-based network 122 may be the Internet, a private data network, or some other suitable packet-based network. The primary function of the GGSN 120 is to provide the UEs 110 with packet-based network connectivity. Data packets are transferred between the GGSN 120 and the UEs 110 through the SGSN 118, which performs primarily the same functions in the packet-based domain as the MSC 112 performs in the circuit-switched domain.

The UMTS air interface is a spread spectrum Direct-Sequence Code Division Multiple Access (DS-CDMA) system. The spread spectrum DS-CDMA spreads user data over a much wider bandwidth through multiplication by a sequence of pseudorandom bits called chips. The TD-SCDMA standard is based on such direct sequence spread spectrum technology and additionally calls for a time division duplexing (TDD), rather than a frequency division duplexing (FDD) as used in many FDD mode UMTS/W-CDMA systems. TDD uses the same carrier frequency for both the uplink (UL) and downlink (DL) between a node B 108 and a UE 110, but divides uplink and downlink transmissions into different time slots in the carrier.

Figure 2:
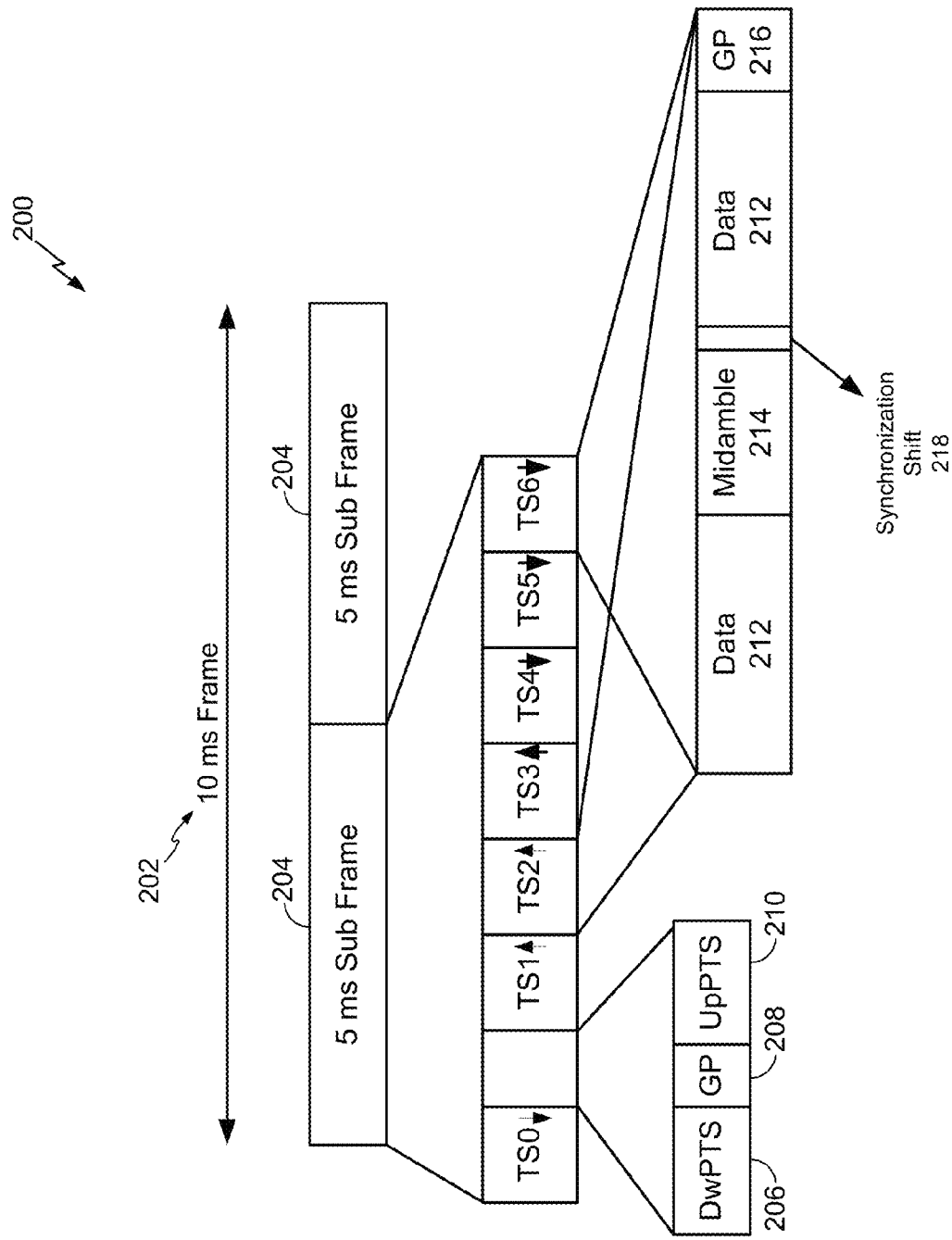
FIG. 2 is a block diagram conceptually illustrating an example of a frame structure in a telecommunications system.

FIG. 2 shows a frame structure 200 for a TD-SCDMA carrier. The TD-SCDMA carrier, as illustrated, has a frame 202 that is 10 ms in length. The chip rate in TD-SCDMA is 1.28 Mcps. The frame 202 has two 5 ms subframes 204, and each of the subframes 204 includes seven time slots, TS0 through TS6. The first time slot, TS0, is usually allocated for downlink communication, while the second time slot, TS1, is usually allocated for uplink communication. The remaining time slots, TS2 through TS6, may be used for either uplink or downlink, which allows for greater flexibility during times of higher data transmission times in either the uplink or downlink directions. A downlink pilot time slot (DwPTS) 206, a guard period (GP) 208, and an uplink pilot time slot (UpPTS) 210 (also known as the uplink pilot channel (UpPCH)) are located between TS0 and TS1. Each time slot, TS0-TS6, may allow data transmission multiplexed on a maximum of 16 code channels. Data transmission on a code channel includes two data portions 212 (each with a length of 352 chips) separated by a midamble 214 (with a length of 144 chips) and followed by a guard period (GP) 216 (with a length of 16 chips). The midamble 214 may be used for features, such as channel estimation, while the guard period 216 may be used to avoid inter-burst interference. Also transmitted in the data portion is some Layer 1 control information, including Synchronization Shift (SS) bits 218. Synchronization Shift bits 218 only appear in the second part of the data portion. The Synchronization Shift bits 218 immediately following the midamble can indicate three cases: decrease shift, increase shift, or do nothing in the upload transmit timing. The positions of the SS bits 218 are not generally used during uplink communications.

Figure 3:
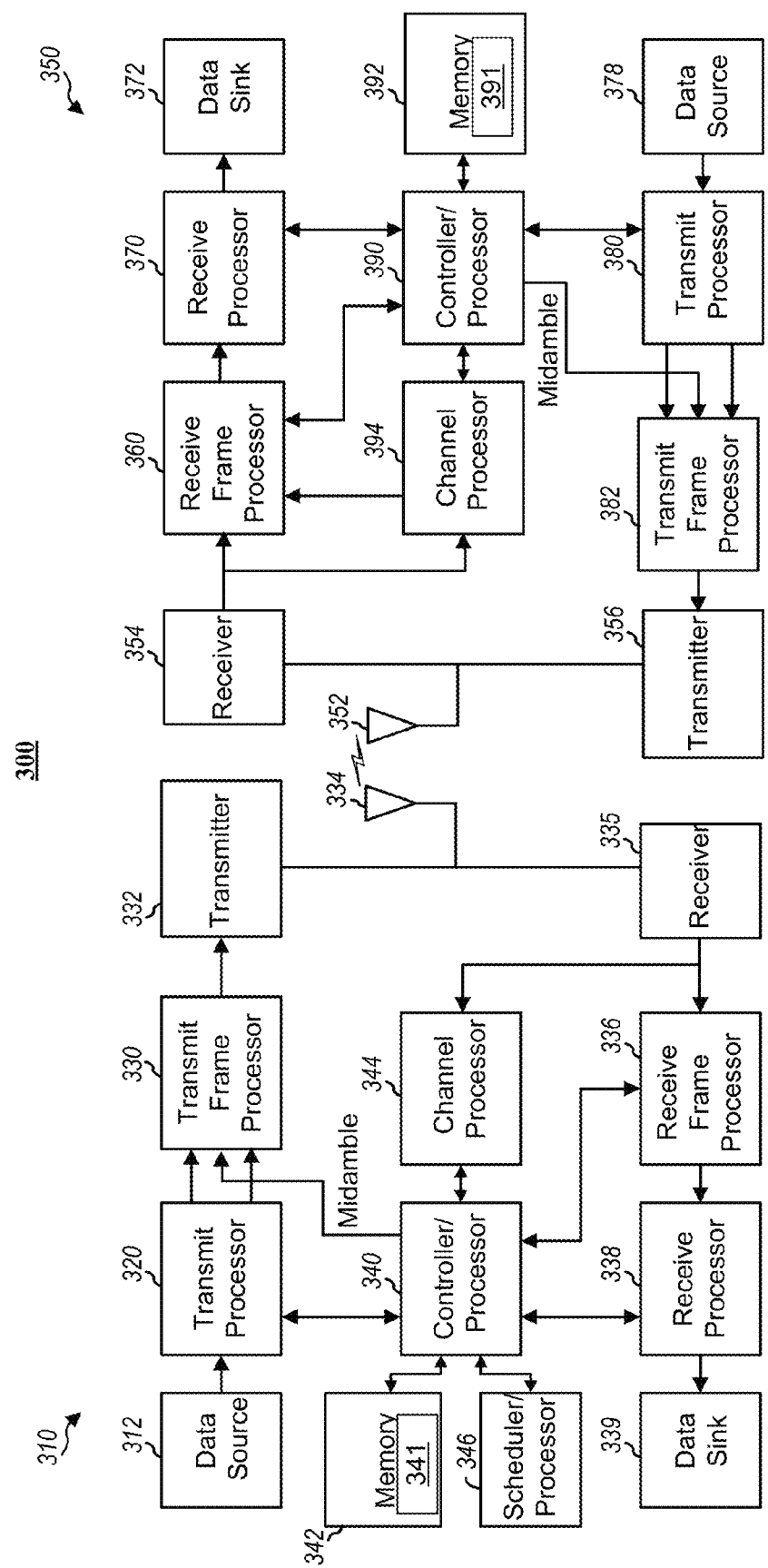
FIG. 3 is a block diagram conceptually illustrating an example of a node B in communication with a user equipment (UE) in a telecommunications system.

FIG. 3 is a block diagram of a node B 310 in communication with a UE 350 in a RAN 300, where the RAN 300 may be the RAN 102 in FIG. 1, the node B 310 may be the node B 108 in FIG. 1, and the UE 350 may be the UE 110 in FIG. 1. In the downlink communication, a transmit processor 320 may receive data from a data source 312 and control signals from a controller/processor 340. The transmit processor 320 provides various signal processing functions for the data and control signals, as well as reference signals (e.g., pilot signals). For example, the transmit processor 320 may provide cyclic redundancy check (CRC) codes for error detection, coding and interleaving to facilitate forward error correction (FEC), mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM), and the like), spreading with orthogonal variable spreading factors (OVSF), and multiplying with scrambling codes to produce a series of symbols. Channel estimates from a channel processor 344 may be used by a controller/processor 340 to determine the coding, modulation, spreading, and/or scrambling schemes for the transmit processor 320. These channel estimates may be derived from a reference signal transmitted by the UE 350 or from feedback contained in the midamble 214 (FIG. 2) from the UE 350. The symbols generated by the transmit processor 320 are provided to a transmit frame processor 330 to create a frame structure. The transmit frame processor 330 creates this frame structure by multiplexing the symbols with a midamble 214 (FIG. 2) from the controller/processor 340, resulting in a series of frames. The frames are then provided to a transmitter 332, which provides various signal conditioning functions including amplifying, filtering, and modulating the frames onto a carrier for downlink transmission over the wireless medium through smart antennas 334. The smart antennas 334 may be implemented with beam steering bidirectional adaptive antenna arrays or other similar beam technologies.

At the UE 350, a receiver 354 receives the downlink transmission through an antenna 352 and processes the transmission to recover the information modulated onto the carrier. The information recovered by the receiver 354 is provided to a receive frame processor 360, which parses each frame, and provides the midamble 214 (FIG. 2) to a channel processor 394 and the data, control, and reference signals to a receive processor 370. The receive processor 370 then performs the inverse of the processing performed by the transmit processor 320 in the node B 310. More specifically, the receive processor 370 descrambles and despreads the symbols, and then determines the most likely signal constellation points transmitted by the node B 310 based on the modulation scheme. These soft decisions may be based on channel estimates computed by the channel processor 394. The soft decisions are then decoded and deinterleaved to recover the data, control, and reference signals. The CRC codes are then checked to determine whether the frames were successfully decoded. The data carried by the successfully decoded frames will then be provided to a data sink 372, which represents applications running in the UE 350 and/or various user interfaces (e.g., display). Control signals carried by successfully decoded frames will be provided to a controller/processor 390. When frames are unsuccessfully decoded by the receiver processor 370, the controller/processor 390 may also use an acknowledgement (ACK) and/or negative acknowledgement (NACK) protocol to support retransmission requests for those frames.

In the uplink, data from a data source 378 and control signals from the controller/processor 390 are provided to a transmit processor 380. The data source 378 may represent applications running in the UE 350 and various user interfaces (e.g., keyboard). Similar to the functionality described in connection with the downlink transmission by the node B 310, the transmit processor 380 provides various signal processing functions including CRC codes, coding and interleaving to facilitate FEC, mapping to signal constellations, spreading with OVSFs, and scrambling to produce a series of symbols. Channel estimates, derived by the channel processor 394 from a reference signal transmitted by the node B 310 or from feedback contained in the midamble transmitted by the node B 310, may be used to select the appropriate coding, modulation, spreading, and/or scrambling schemes. The symbols produced by the transmit processor 380 will be provided to a transmit frame processor 382 to create a frame structure. The transmit frame processor 382 creates this frame structure by multiplexing the symbols with a midamble 214 (FIG. 2) from the controller/processor 390, resulting in a series of frames. The frames are then provided to a transmitter 356, which provides various signal conditioning functions including amplification, filtering, and modulating the frames onto a carrier for uplink transmission over the wireless medium through the antenna 352.

The uplink transmission is processed at the node B 310 in a manner similar to that described in connection with the receiver function at the UE 350. A receiver 335 receives the uplink transmission through the antenna 334 and processes the transmission to recover the information modulated onto the carrier. The information recovered by the receiver 335 is provided to a receive frame processor 336, which parses each frame, and provides the midamble 214 (FIG. 2) to the channel processor 344 and the data, control, and reference signals to a receive processor 338. The receive processor 338 performs the inverse of the processing performed by the transmit processor 380 in the UE 350. The data and control signals carried by the successfully decoded frames may then be provided to a data sink 339 and the controller/processor, respectively. If some of the frames were unsuccessfully decoded by the receive processor, the controller/processor 340 may also use an acknowledgement (ACK) and/or negative acknowledgement (NACK) protocol to support retransmission requests for those frames.

The controller/processors 340 and 390 may be used to direct the operation at the node B 310 and the UE 350, respectively. For example, the controller/processors 340 and 390 may provide various functions including timing, peripheral interfaces, voltage regulation, power management, and other control functions. The computer readable media of memories 342 and 392 may store data and software for the node B 310 and the UE 350, respectively. For example, the memory 392 of the UE 350 may store a redirection module 391 which, when executed by the controller/processor 390, configures the UE 350 for circuit switched fall back redirection across mobile switching center pools. A scheduler/processor 346 at the node B 310 may be used to allocate resources to the UEs and schedule downlink and/or uplink transmissions for the UEs. For example, the memory 342 of the node B 310 may store a redirection module 341 which, when executed by the controller/processor 340, configures the node B 340 for circuit switched fall back redirection across mobile switching center pools.

Figure 4:
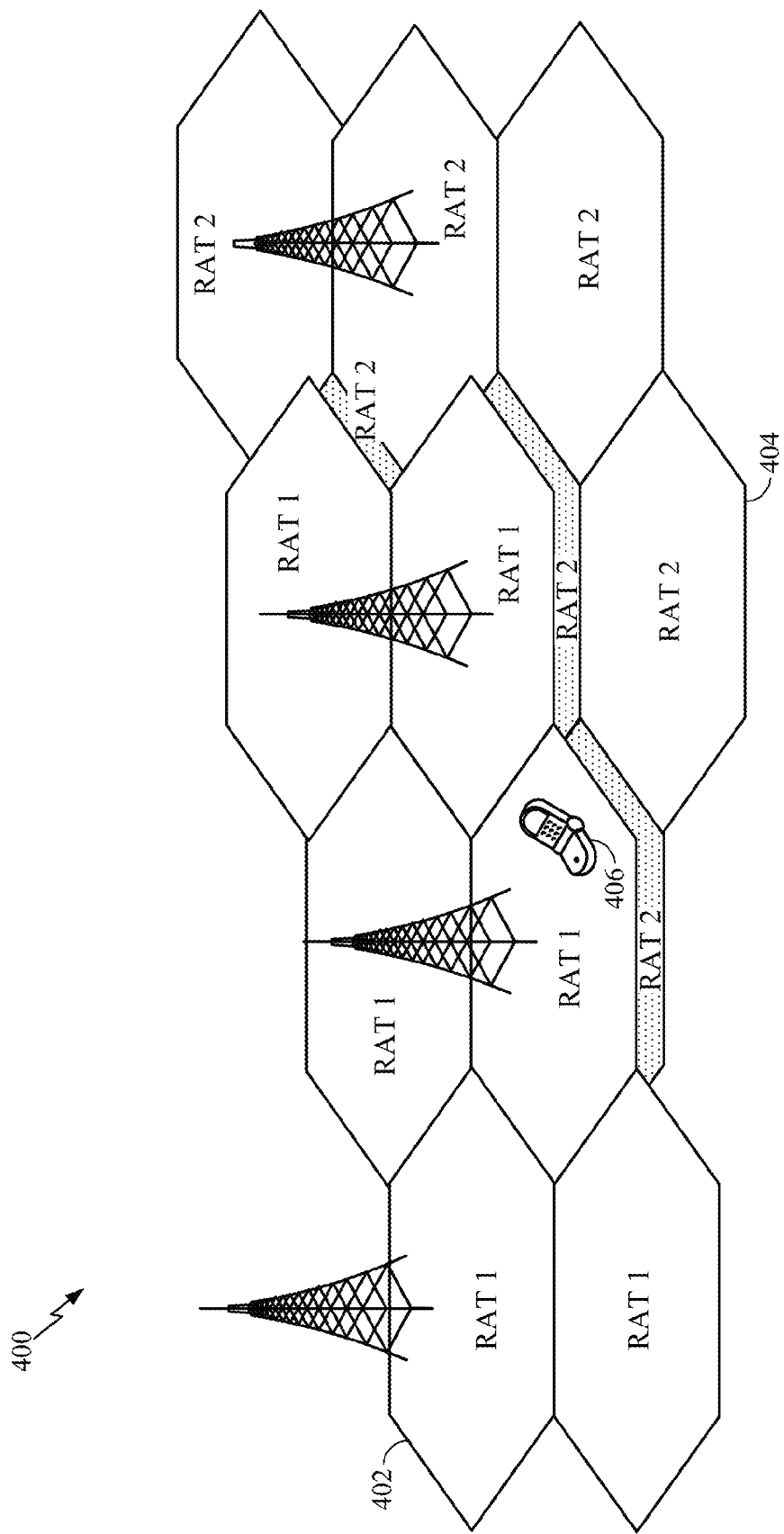
FIG. 4 illustrates network coverage areas according to aspects of the present disclosure.

Some networks, such as a newly deployed network, may cover only a portion of a geographical area. Another network, such as an older more established network, may better cover the area, including remaining portions of the geographical area. FIG. 4 illustrates coverage of an established network utilizing a first type of radio access technology (RAT-1), such as GSM, TD-SCDMA or Long Term Evolution (LTE) and also illustrates a newly deployed network utilizing a second type of radio access technology (RAT-2), such as a GSM, TD-SCDMA or Long Term Evolution (LTE).

The geographical area 400 may include RAT-1 cells 402 and RAT-2 cells 404. In one example, the RAT-1 cells are TD-SCDMA/GSM cells and the RAT-2 cells are LTE cells. However, those skilled in the art will appreciate that other types of radio access technologies may be utilized within the cells. A user equipment (UE) 406 may move from one cell, such as a RAT-1 cell 404, to another cell, such as a RAT-2 cell 402. The movement of the UE 406 may specify a handover or a cell reselection.

Redirection from one RAT to another RAT is commonly used to perform operations such as load balancing or circuit switched fallback from one RAT to another RAT. For example, one of the RATs may be long term evolution (LTE) while the other RAT may be universal mobile telecommunications system-frequency division duplexing (UMTS FDD), universal mobile telecommunications system-time division duplexing (UMTS TDD), or global system for mobile communications (GSM). In some aspects, the redirection may be from a frequency or cell of one RAT to a frequency or cell of the same RAT.

Circuit switched fall back is a feature that enables multimode user equipments (UEs) that are capable of communicating on a first RAT (e.g., LTE) in addition to communicating on a second RAT (e.g., second/third generation (2G/3G) RAT) to obtain circuit switched voice services while being camped on the first RAT. For example, the circuit switched fall back capable UE may initiate a mobile-originated (MO) circuit switched voice call while on LTE. Because of the mobile-originated circuit switched voice call, the UE is redirected to a circuit switched capable RAT. For example, the UE is redirected to a radio access network (RAN), such as a 3G/2G network, for the circuit switched voice call setup. In some instances, the circuit switched fall back capable UE may be paged for a mobile-terminated (MT) voice call while on LTE, which results in the UE being moved to 3G or 2G for the circuit switched voice call setup.

In some implementations, the UE may be redirected to a circuit switched capable RAT that is in a different mobile switching center (MSC) pool than a current mobile switching center pool on which the UE is currently registered.

Figure 5:
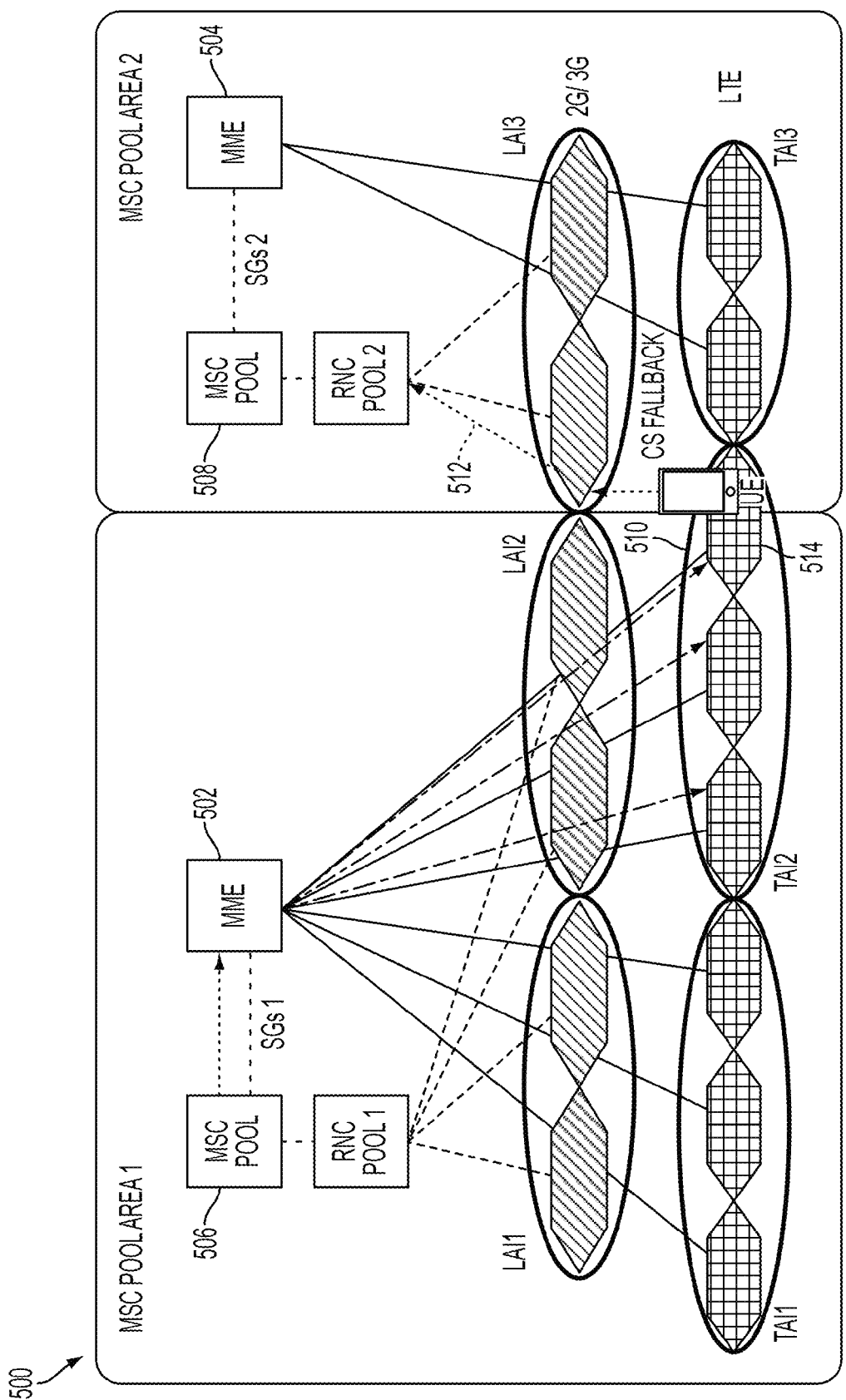
FIG. 5 illustrates a mobile switching center (MSC) pool architecture according to aspects of the present disclosure.

FIG. 5 illustrates a mobile switching center pool architecture 500. The mobile switching center pool architecture 500 may conform to Third Generation Partnership Project (3GPP) Release 5 specifications for connection of radio access network (RAN) nodes to multiple core network (CN) nodes. Mobile switching center servers within a pooled area serve all cells in the mobile switching center pool, which eliminates mobile switching center borders and the time delay associated with inter-mobile switching center location area updates (LAUs) within the mobile switching center pool. A mobile switching center pool may be similar to a single high capacity mobile switching center. For example, a temporary mobile subscriber identity (TMSI) allocated by one mobile switching center in the mobile switching center pool is understood by other mobile switching centers in the mobile switching center pool.

The architecture 500 includes two mobility management entities (MMEs) 502 and 504 for setting up calls that support mobile switching center pools 506 and 508, respectively. The mobility management entities 502 and 504 receive tracking area update (TAU) requests from the UE corresponding to tracking areas of a first radio access technology (e.g., Long Term Evolution (LTE)). For example, the tracking area update request may include a tracking area identity (TAI) to identify tracking areas of the first RAT. The tracking area includes an area in which a UE can move around without updating the mobility management entity. The tracking area identity may be based on a tracking area code (TAC). Each base station (e.g., eNB) is configured with its own tracking area. The tracking area includes cells or base stations of the first RAT. For example, base stations in a first neighborhood are defined as TA1, those in a second neighborhood as TA2, those in a third neighborhood as TA3, and so on. The tracking areas, TA1, TA2 and TA3 may be identified by tracking area identities TAI1, TAI2 and TAI3.

The mobility management entity translates tracking area update requests into location area update requests corresponding to a second RAT. The mobility management entity then sends the location area update request to the mobile switching center pool and/or radio network controller (RNC) (e.g., RNC Pool 1 or 2) selected as a tracking mobile switching center pool to establish the mobility management entity as a network node through which the UE is paged. The location area update request may include current location information of the UE, such as tracking area identity. The mobility management entity receives a location area update response from the tracking mobile switching center pool/RNC that includes information identifying one or more suitable location area identifiers (LAI) of a second RAT (e.g., 2G or 3G RAT) for handover of the UE. Each location area of a public land mobile network (PLMN) has its own unique identifier, which is known as the location area identity. The location area identity may be part of a second RAT (e.g., GSM) Temporary Mobile Subscriber Identity (TMSI) to identify a cell of the second RAT. The location area identity may be broadcast by a network of the second RAT. For example, the location area identity is broadcast regularly through a Broadcast Control Channel (BCCH). A change of location area may give rise to a location area update request.

When an LTE tracking area identity, TAI1, coverage coincides or is aligned with location area identity, LAI1 coverage in the same mobile switching center pool, the UE can fall back to a cell in the second RAT (e.g., 2G/3G) corresponding to the location area identity, LAI1. The UE may be registered to the mobile switching center pool during a combined attach procedure, such as evolved packet systems/international mobile subscriber identity (EPS/IMSI) procedure. For a combined attach procedure the UE is simultaneously registered to a location area in the second RAT and to a tracking area in the first RAT.

In some instances, however, coverage boundaries based on the location area identity and tracking area identity may not be aligned. For example, the coverage boundaries may be subject to misalignment with respect to tracking area identity. The coverage misalignment is illustrated in FIG. 5 by a local area-tracking area (LA-TA) misalignment on the mobile switching center pool coverage boundaries corresponding to a current location of the UE 514.

As shown, the UE 514 registered under tracking area identity TAI2/location area identity LAI2 of mobile switching center pool 506 receives a page for a mobile terminated call. To establish the mobile terminated call, a circuit switched fall back procedure is initiated to redirect the UE 514 from the first RAT (e.g., LTE) to the second RAT (e.g., 2G/3G). For example, the UE 514 attempts to fall back to a 2G/3G network to eventually reselect a cell (illustrated by line arrows 510 and 512) in 2G/3G in the same mobile switching center pool 506.

In some instances, however, the 2G/3G location area identity, LAI2, in the mobile switching center pool 506 may not be aligned with the LTE tracking area identity, TAI2, in the mobile switching center pool 506. Instead, the LTE tracking area identity, TAI2, may be aligned with a 2G/3G location area identity, LAI3, in a different mobile switching center pool 508. For example, an LTE cell may overlap with one or more 2G/3G cells that belong to different location area cells associated with a different mobile switching center pool.

Consequently, the UE sends the paging response to the mobile switching center pool 508, which is not aware of the call establishment and does not have the subscriber's profile. For example, the UE 514 camped on an LTE cell, may receive a circuit switched page forwarded by the LTE cell from a first mobile switching center pool 506 but redirected to a 2G/3G cell belonging to different mobile switching center pool 508. Consequently, the UE sends the paging response to the mobile switching center pool 508, which is not aware of the call establishment and does not have the subscriber's profile causing redirection failure or call setup failure.

One way to resolve the redirection failure is to implement a Mobile Terminated Roaming Retry (MTRR) (or Mobile Terminated Roaming Retry (MTRF)) procedure. Mobile Terminated Roaming Retry allows the incoming call to be transferred from the mobile switching center pool 506 to the mobile switching center pool 508, so that the mobile switching center pool 508 understands the paging response and sets up the call. Mobile Terminated Roaming Retry, however, is not widely deployed. Without Mobile Terminated Roaming Retry, the UE falls back to the 2G/3G cell belonging to a different mobile switching center pool from the mobile switching center pool that the UE is registered, which causes the mobile terminated call to fail.

Another way to resolve the redirection failure is through network frequency planning Alignment of LTE tracking area cells with 2G/3G location area cells is challenging through network frequency planning, however. The difficulty stems from the difference in LTE and UMTS radio cell coverage patterns and the different frequency or antenna locations or load variations.

Circuit Switched Fall Back Redirection Across Mobile Switching Center Pools

Aspects of the present disclosure are directed to avoiding or mitigating mobile terminated circuit switched fall back (CSFB) redirection failure across mobile switching center pool boundaries. In one aspect of the disclosure, a user equipment receives a circuit switched (CS) page from a first radio access technology (RAT). For example, a circuit switched fall back capable UE may be paged for a mobile-terminated (MT) voice call while on the first RAT (e.g., LTE) of a current mobile switching center pool, which results in the UE being redirected or moved to a second RAT (e.g., 3G/2G) to set up the circuit-switched voice call. The UE may be paged while the UE is in a vicinity or proximate to other mobile switching center (MSC) pools that are different from the current mobile switching center pool on which the UE is registered.

To set up the circuit-switched voice call, the UE may receive a command (e.g., redirection command) from the first RAT indicating that the UE is redirected to the second RAT for the circuit-switched voice call setup. In some aspects of the disclosure, the redirection command may also include one or more designated location area identities that correspond to one or more cells of the second RAT. The location area identity may indicate area(s) that include multiple base stations or cells. The UE detects or identifies multiple base stations or cells of the base stations associated with the second RAT. Detecting the base stations may include detecting cells of the same or different frequencies associated with the base stations.

The UE then determines the strongest of the base stations or the strongest cell corresponding to the base stations. To determine the strongest base station, the UE may receive a list of frequencies of neighboring cells. In one aspect of the disclosure, the list of frequencies may be included in the redirection command. The strength of the base station may be measured based on the signal quality of the frequencies from the base stations. For example, the UE may perform a power scan using the list of frequencies, and determine a strongest cell in these frequencies.

It is to be understood that the term "signal quality" is non-limiting. Signal quality is intended to cover any type of signal metric such as received signal code power (RSCP), reference signal received power (RSRP), reference signal received quality (RSRQ), received signal strength indicator (RSSI), signal to noise ratio (SNR), signal to interference plus noise ratio (SINR), etc.

The UE may determine whether the location area of the strongest base station and corresponding cell(s) is in a location area identified by the one or more location area identities designated in the redirection message. In one aspect of the disclosure, the UE determines the location area identities (LAI) or codes (LAC) of the base stations or cells by performing broadcast channel decoding to read the location area codes associated with the identified cell(s). The UE may camp on the strongest base station based on the determination of whether the location area of the strongest base station is in an area identified by the designated location area identities. For example, when the location area of the strongest base station is in a permitted area of the designated location area identities, the UE proceeds with the mobile terminated call establishment to connect to the strongest base station. Otherwise, the UE attempts to connect to a different base station.

In one aspect of the disclosure, the redirection command to move the UE from the first RAT to the second RAT for the circuit switched call establishment includes a list of permitted location areas to which a UE may redirect and/or a list of prohibited location areas to which a UE may not redirect. The list of location areas may be identified by location area identities and/or location area codes. In one aspect of the disclosure, the list of permitted/prohibited location areas may be broadcast from one or more base station controllers (BSCs) or radio network controllers (RNCs) of the mobile switching center pools. The list of prohibited and/or permitted location areas may be included with a list of recommended frequencies of the second RAT on which the UE may attempt to camp to set up the mobile terminated circuit switched call.

When a decoded location area code or identity of a cell or corresponding base station is in the list of permitted location area codes (or not in the list of prohibited location area codes) the UE may camp on the cell and proceed with the mobile terminated call establishment. If the decoded location area code of the cell, however, is not in the list of permitted location area codes (or in the list of prohibited location area codes) the UE may abort any attempts to camp on that cell. In this case, the UE identifies a next strongest cell (and so on) until a desirable cell in a permitted (or not prohibited) location area is identified. Thus, the UE may be connected to the strongest base station when the location area of the strongest base station is in the list of permitted location areas or is not in the list of prohibited location areas.

In one aspect of the disclosure, the UE aborts procedures (e.g., ongoing or initiated procedures) to camp on a first strongest base station when the first strongest base station is in a prohibited location area. Consequently, the UE attempts to camp on a second strongest base station. For example, the UE determines whether the second strongest base station is in the permitted or prohibited location area. The UE then connects to the second strongest base station when the second strongest base station is in a permitted location area.

In one aspect of the disclosure, a base station or eNode B of the first RAT sends or transmits the circuit switched page and the redirection command to the UE. The redirection command includes the designated location area identities of the second RAT. As noted, the designated location area identities may include permitted and/or prohibited location areas. The LTE base station identifies a location area of the second RAT associated with a first mobile switching center pool. In one aspect, the designated location area identities of the second RAT include the prohibited location area and/or the permitted location areas.

In another aspect of the disclosure, the designated location area identities correspond to prohibited location areas when the base station of the first RAT is in a location area of a second mobile switching center pool adjacent to a first mobile switching center pool on which the UE is currently registered. The second mobile switching center pool does not support communication with the first mobile switching center pool. The location area may be prohibited because it belongs to the second mobile switching center pool that is subject to time delay of inter-mobile switching center location area updates within the mobile switching center pool. The prohibited location area may be included in a list of other prohibited location areas to be transmitted by the base station with the redirection information in a redirection command.

In one aspect of the disclosure, the UE avoids the cross mobile switching center pool situations where the UE sends a paging response to a different mobile switching center pool than the mobile switching center pool at which the UE is currently registered. Avoiding the cross mobile switching center pool situations effectively avoids circuit switched fall back mobile terminated call establishment failure across mobile switching center pool boundaries and speeds up circuit switched fall back mobile terminated call establishment procedures.

Figure 6:
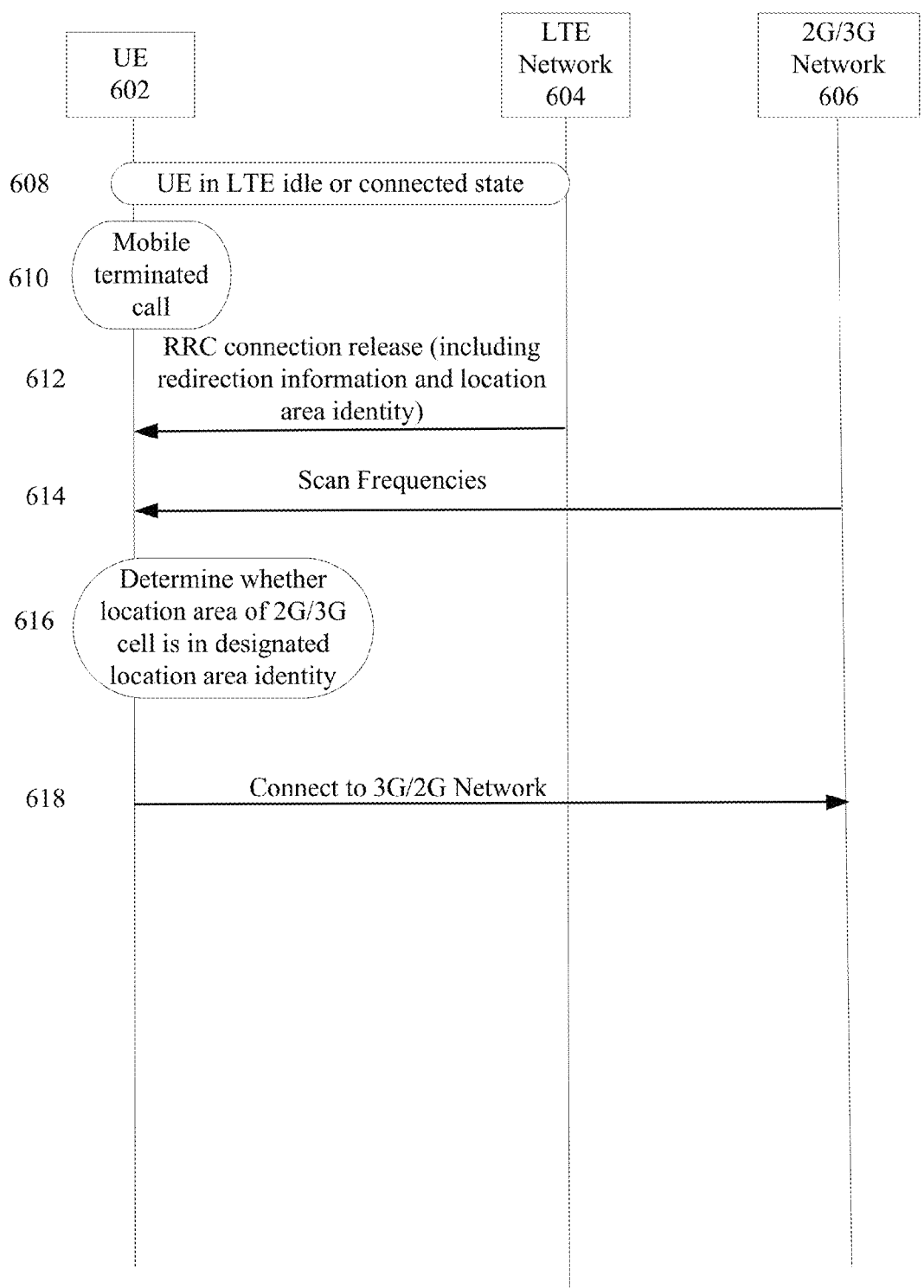
FIG. 6 is a call flow diagram illustrating a redirection procedure according to aspects of the present disclosure.

FIG. 6 is a call flow diagram illustrating a redirection procedure according to aspects of the present disclosure. A circuit switched fall back UE 602 may be paged for a mobile-terminated (MT) voice call while the UE 602 is in idle or connected mode with the LTE network 604. To establish the mobile terminated voice call, the UE 602 is redirected to the circuit switched capable RAT 606 for circuit switched voice call setup.

For example, at time 608, the UE 602 communicates with the LTE network 604. At time 610, the UE 602 is paged for the mobile-terminated (MT) voice call. The LTE network 604 sends a radio resource control (RRC) connection release message to the UE 602 at time 612. The radio resource control connection release message contains redirection information. In some aspects of the present disclosure, the redirection information may include a designated location area identity corresponding to circuit switched capable RATs. The designated location area identity may be transmitted to the UE in other ways. For example, the indication may be included in one or more system information blocks (SIBs). The release message can also include frequencies of the circuit switched capable RAT 606 for scanning.

At time 614, the UE scans frequencies of the circuit switched network 606 to locate potential cells for the redirection. At time 616, the UE 602 determines whether a location area of the strongest detected circuit switched cell is within a location area corresponding to the designated location area identity. At time 618, the UE 602 connects to the strongest cell of the circuit switched capable RAT 606 when the location area of the cell is in the designated location area identity. In this case the designated location area identity is a white list. If the designated location area identity is a black list, the UE connects to the strongest cell of the circuit switched capable RAT 606 when the strongest cell is not in a location area corresponding to the designated location area identity.

Figure 7:
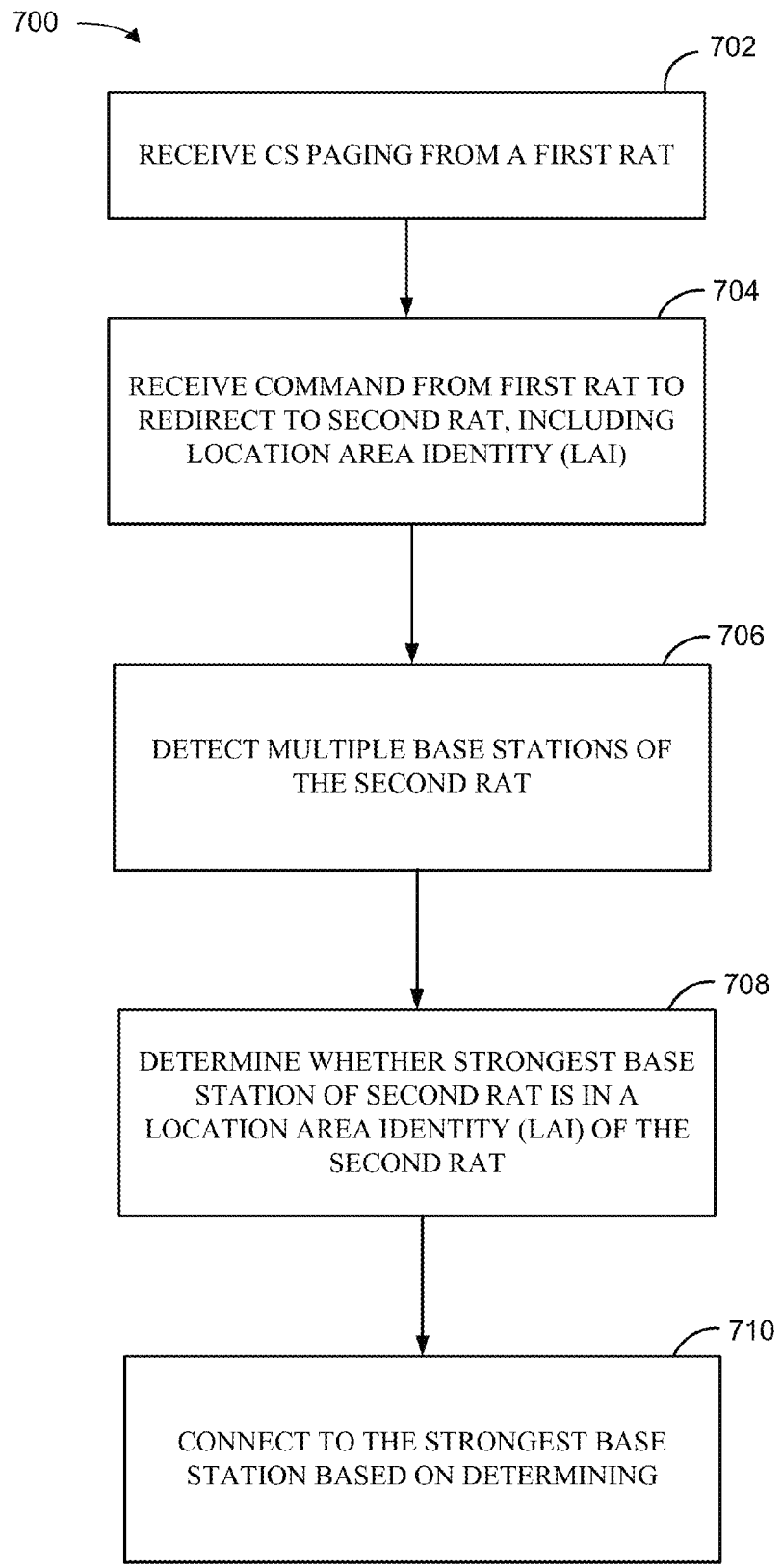
FIG. 7 is a block diagram illustrating a method for wireless communication according to one aspect of the present disclosure.

FIG. 7 shows a wireless communication method 700 according to one aspect of the disclosure. A UE receives circuit switched (CS) paging from a first radio access technology (RAT), as shown in block 702. The UE also receives a command from the first RAT to redirect to a second RAT, as shown in block 704. The command includes an indication of at least one designated location area identity of the second RAT. The UE detects multiple base stations of the second RAT, as shown in block 706. Further, the UE determines whether a strongest of the base stations is in the designated location area identity, as shown in block 708. Finally, the UE connects to the strongest base station based on the determining, as shown in block 710. For example, if the designated location area identity is a white list, the UE connects to the strongest base station when it is in the location area identity. On the other hand, of the designate location area identifier is a black list, the UE does not connect to the strongest base station when it is in the location area identity.

Figure 8:
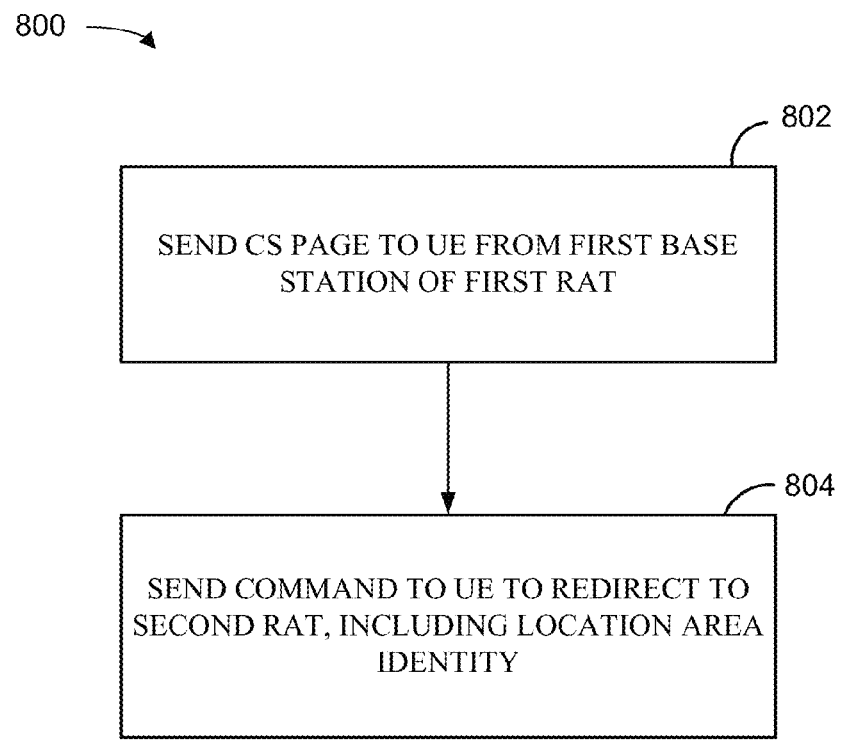
FIG. 8 is a block diagram illustrating a method for wireless communication according to one aspect of the present disclosure.

FIG. 8 shows a wireless communication method 800 according to one aspect of the disclosure. A node B of a first radio access technology (RAT) sends circuit switched (CS) paging to a user equipment (UE), as shown in block 802. The node B sends a command to the UE to redirect to a second RAT, as shown in block 804. The command includes an indication of at least one designated location area identity of the second RAT.

Figure 9:
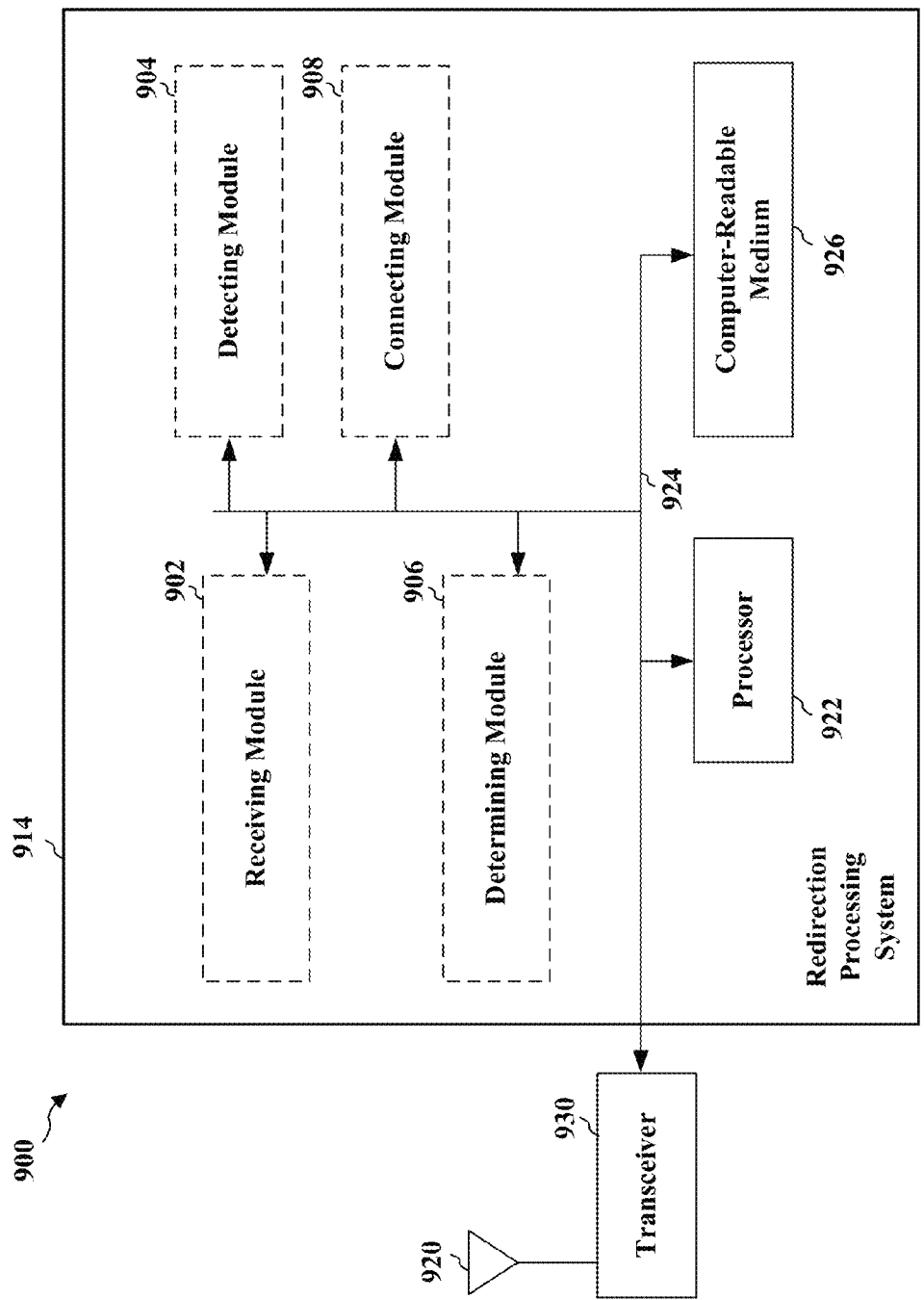
FIG. 9 is a diagram illustrating an example of a hardware implementation for an apparatus employing a processing system according to one aspect of the present disclosure.

FIG. 9 is a diagram illustrating an example of a hardware implementation for an apparatus 900 employing a redirection processing system 914. The redirection processing system 914 may be implemented with a bus architecture, represented generally by the bus 924. The bus 924 may include any number of interconnecting buses and bridges depending on the specific application of the redirection processing system 914 and the overall design constraints. The bus 924 links together various circuits including one or more processors and/or hardware modules, represented by the processor 922 the modules 902, 904, 906, 908 and the non-transitory computer-readable medium 926. The bus 924 may also link various other circuits such as timing sources, peripherals, voltage regulators, and power management circuits, which are well known in the art, and therefore, will not be described any further.

The apparatus includes a redirection processing system 914 coupled to a transceiver 930. The transceiver 930 is coupled to one or more antennas 920. The transceiver 930 enables communicating with various other apparatuses over a transmission medium. The redirection processing system 914 includes a processor 922 coupled to a non-transitory computer-readable medium 926. The processor 922 is responsible for general processing, including the execution of software stored on the computer-readable medium 926. The software, when executed by the processor 922, causes the redirection processing system 914 to perform the various functions described for any particular apparatus. The computer-readable medium 926 may also be used for storing data that is manipulated by the processor 922 when executing software.

The redirection processing system 914 includes a receiving module 902 for receiving circuit switched paging from a first RAT and for receiving a command from the first to redirect to a second RAT. The redirection processing system 914 includes a detecting module 904 for detecting multiple base stations of the second RAT. The redirection processing system 914 includes a determining module 906 for determining whether a first strongest base station is in a designated location area corresponding to the at least one designated location area identification. The redirection processing system 914 includes a connecting module 908 for connecting to the first strongest base station based on the determining. The modules may be software modules running in the processor 922, resident/stored in the computer readable medium 926, one or more hardware modules coupled to the processor 922, or some combination thereof. The redirection processing system 914 may be a component of the UE 350 and may include the memory 392, and/or the controller/processor 390.

In one configuration, an apparatus such as a UE is configured for wireless communication including means for receiving. In one aspect, the receiving means may be the antennas 352/920, the receiver 354, the transceiver 930, the channel processor 394, the receive frame processor 360, the receive processor 370, the controller/processor 390, the memory 392, the redirection module 391, the receiving module 902, and/or the redirection processing system 914 configured to perform the aforementioned means. The UE is also configured to include means for detecting. In one aspect, the detecting means may be the antennas 352/920, the receiver 354, the channel processor 394, the receive frame processor 360, the receive processor 370, the controller/processor 390, the memory 392, redirection module 391, the detecting module 904 and/or the redirection processing system 914 configured to perform the aforementioned means. The UE is also configured to include means for determining. In one aspect, the determining means may be the controller/processor 390, the memory 392, redirection module 391, the determining module 906 and/or the redirection processing system 914 configured to perform the aforementioned means. The UE is also configured to include means for connecting. In one aspect, the connecting means may be the antennas 352/920, the receiver 354, the channel processor 394, the receive frame processor 360, the receive processor 370, the transmitter 356, the transmit frame processor 382, the transmit processor 380, the controller/processor 390, the memory 392, redirection module 391, the connecting module 908 and/or the redirection processing system 914 configured to perform the aforementioned means. In one configuration, the means functions correspond to the aforementioned structures. In another aspect, the aforementioned means may be a module or any apparatus configured to perform the functions recited by the aforementioned means.

Figure 10:
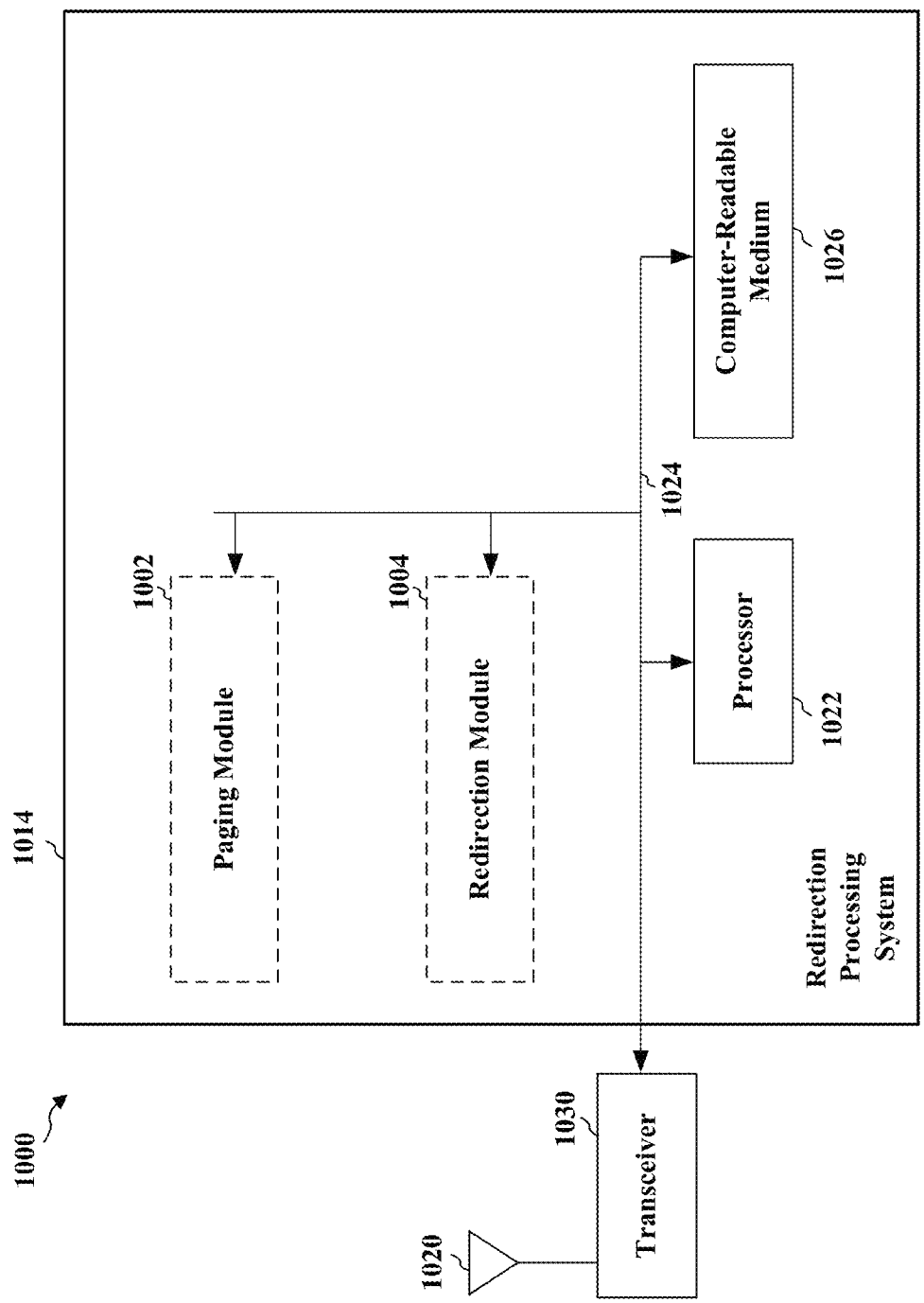
FIG. 10 is a diagram illustrating an example of a hardware implementation for an apparatus employing a processing system according to one aspect of the present disclosure.

FIG. 10 is a diagram illustrating an example of a hardware implementation for an apparatus 1000 employing a redirection processing system 1014. The redirection processing system 1014 may be implemented with a bus architecture, represented generally by the bus 1024. The bus 1024 may include any number of interconnecting buses and bridges depending on the specific application of the redirection processing system 1014 and the overall design constraints. The bus 1024 links together various circuits including one or more processors and/or hardware modules, represented by the processor 1022, the modules 1002, 1004 and the non-transitory computer-readable medium 1026. The bus 1024 may also link various other circuits such as timing sources, peripherals, voltage regulators, and power management circuits, which are well known in the art, and therefore, will not be described any further.

The apparatus includes a redirection processing system 1014 coupled to a transceiver 1030. The transceiver 1030 is coupled to one or more antennas 1020. The transceiver 1030 enables communicating with various other apparatuses over a transmission medium. The redirection processing system 1014 includes a processor 1022 coupled to a non-transitory computer-readable medium 1026. The processor 1022 is responsible for general processing, including the execution of software stored on the computer-readable medium 1026. The software, when executed by the processor 1022, causes the redirection processing system 1014 to perform the various functions described for any particular apparatus. The computer-readable medium 1026 may also be used for storing data that is manipulated by the processor 1022 when executing software.

The redirection processing system 1014 includes a paging module 1002 for sending circuit switched (CS) paging to a user equipment (UE) from a first base station of a first radio access technology (RAT). The redirection processing system 1014 also includes a redirection module 1004 for sending a command to the UE to redirect to a second RAT. The modules may be software modules running in the processor 1022, resident/stored in the computer readable medium 1026, one or more hardware modules coupled to the processor 1022, or some combination thereof. The redirection processing system 1014 may be a component of the node B 310 and may include the memory 342, and/or the controller/processor 340.

In one configuration, an apparatus such as a node B is configured for wireless communication including means for sending. In one aspect, the sending means may be the antenna 352, the transmitter 356, the transmit frame processor 382, the transmit processor 380, the controller/processor 390, the memory 392, the redirection module 341, the sending module 1002 and/or the redirection processing system 1014 configured to perform the aforementioned means. In one configuration, the means functions correspond to the aforementioned structures. In another aspect, the aforementioned means may be a module or any apparatus configured to perform the functions recited by the aforementioned means.

Several aspects of a telecommunications system have been presented with reference to LTE, TD-SCDMA and GSM systems. As those skilled in the art will readily appreciate, various aspects described throughout this disclosure may be extended to other telecommunication systems, network architectures and communication standards. By way of example, various aspects may be extended to other UMTS systems such as W-CDMA, High Speed Downlink Packet Access (HSDPA), High Speed Uplink Packet Access (HSUPA), High Speed Packet Access Plus (HSPA+) and TD-CDMA. Various aspects may also be extended to systems employing Long Term Evolution (LTE) (in FDD, TDD, or both modes), LTE-Advanced (LTE-A) (in FDD, TDD, or both modes), CDMA2000, Evolution-Data Optimized (EV-DO), Ultra Mobile Broadband (UMB), IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Several processors have been described in connection with various apparatuses and methods. These processors may be implemented using electronic hardware, computer software, or any combination thereof. Whether such processors are implemented as hardware or software will depend upon the particular application and overall design constraints imposed on the system. By way of example, a processor, any portion of a processor, or any combination of processors presented in this disclosure may be implemented with a microprocessor, microcontroller, digital signal processor (DSP), a field-programmable gate array (FPGA), a programmable logic device (PLD), a state machine, gated logic, discrete hardware circuits, and other suitable processing components configured to perform the various functions described throughout this disclosure. The functionality of a processor, any portion of a processor, or any combination of processors presented in this disclosure may be implemented with software being executed by a microprocessor, microcontroller, DSP, or other suitable platform.

Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a non-transitory computer-readable medium. A computer-readable medium may include, by way of example, memory such as a magnetic storage device (e.g., hard disk, floppy disk, magnetic strip), an optical disk (e.g., compact disc (CD), digital versatile disc (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, or a removable disk. Although memory is shown separate from the processors in the various aspects presented throughout this disclosure, the memory may be internal to the processors (e.g., cache or register).

Computer-readable media may be embodied in a computer-program product. By way of example, a computer-program product may include a computer-readable medium in packaging materials. Those skilled in the art will recognize how best to implement the described functionality presented throughout this disclosure depending on the particular application and the overall design constraints imposed on the overall system.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. A method of wireless communication comprising:
   receiving circuit switched (CS) paging from a first radio access technology (RAT) for a new mobile terminated call to be set up and established;
   initiating a redirection procedure in response to the CS paging to set up and establish the mobile terminated call including:
      receiving a command from the first RAT to redirect to a second RAT, the command including an indication of at least one designated location area identity of at least one base station of a plurality of base stations of the second RAT;
      detecting the plurality of base stations of the second RAT;
      determining whether a location area of a first strongest base station of the plurality of base stations is included in the command; and
      connecting to the first strongest base station based on the determining.

2. The method of claim 1, in which the at least one designated location area identity comprises a permitted location area, and in which the method further comprises connecting to the first strongest base station when the location area of the first strongest base station is included in the permitted location area.

3. The method of claim 1, in which the at least one designated location area identity comprises a prohibited location area, and in which the method further comprises connecting to the first strongest base station when the location area of the first strongest base station is not included in the prohibited location area.

4. The method of claim 1, in which the at least one designated location area identity comprises a prohibited location area, and in which the method further comprises:
   aborting a camping procedure with the first strongest base station when the first strongest base station is included in the prohibited location area.

5. The method of claim 4, further comprising determining whether a location area of a second strongest base station is included in the command.

6. The method of claim 5, further comprising connecting to the second strongest base station based on the determining.

7. A method of wireless communication comprising:
   sending circuit switched (CS) paging to a user equipment (UE) from a base station of a first radio access technology (RAT) for a new mobile terminated call to be set up and established; and
   sending a command to the UE to redirect to a second RAT in accordance with an initiated redirection procedure in response to the CS paging to set up and establish the mobile terminated call, the command including an indication of at least one designated location area identity of at least one base station of the second RAT.

8. The method of claim 7, in which the at least one designated location area identity comprises a permitted location area and in which the method further comprises:
   identifying a location area of the second RAT associated with a first mobile switching center (MSC) pool, the at least one designated location area identity including the identified location area of the second RAT associated with the first mobile switching center pool.

9. The method of claim 7, in which the at least one designated location area identity comprises a prohibited location area and in which the method further comprises:
   identifying a second mobile switching center pool adjacent to the first mobile switching center pool, in which the second mobile switching center pool does not support communication with the first mobile switching center pool.

10. The method of claim 9, further comprising identifying a location area of the second RAT associated with the second mobile switching center pool, the at least one designated location area identity including the location area of the second RAT associated with the second mobile switching center pool, the location area of the second RAT being the prohibited location area.

11. An apparatus for wireless communication comprising:
   a memory; and
   at least one processor coupled to the memory and configured:
      to receive circuit switched (CS) paging from a first radio access technology (RAT) for a new mobile terminated call to be set up and established;
      to initiate a redirection procedure in response to the CS paging to set up and establish the mobile terminated call including:
         receiving a command from the first RAT to redirect to a second RAT, the command including an indication of at least one designated location area identity of at least one base station of a plurality of base stations of the second RAT;
         detecting the plurality of base stations of the second RAT;
         determining whether a location area of a first strongest base station of the plurality of base stations is included in the command; and
         connecting to the first strongest base station based on the determining.

12. The apparatus of claim 11, in which the at least one designated location area identity comprises a permitted location area, and in which the at least one processor is further configured to connect to the first strongest base station when the location area of the first strongest base station is included in the permitted location area.

13. The apparatus of claim 11, in which the at least one designated location area identity comprises a prohibited location area, and in which the at least one processor is further configured to connect to the first strongest base station when the location area of the first strongest base station is not included in the prohibited location area.

14. The apparatus of claim 11, in which the at least one designated location area identity comprises a prohibited location area, and in which the at least one processor is further configured:
   to abort a camping procedure with the first strongest base station when the first strongest base station is included in the prohibited location area.

15. The apparatus of claim 14, in which the at least one processor is further configured to determine whether a location area of a second strongest base station is included in the command.

16. The apparatus of claim 15, in which the at least one processor is further configured to connect to the second strongest base station based on the determining.

17. An apparatus for wireless communication comprising:
   a memory; and
   at least one processor coupled to the memory and configured:
      to send circuit switched (CS) paging to a user equipment (UE) from a base station of a first radio access technology (RAT) for a new mobile terminated call to be set up and established; and
      to send a command to the UE to redirect to a second RAT in accordance with an initiated redirection procedure in response to the CS paging to set up and establish the mobile terminated call, the command including an indication of at least one designated location area identity of at least one base station of the second RAT.

18. The apparatus of claim 17, in which the at least one designated location area identity comprises a permitted location area and in which the at least one processor is further configured to identify a location area of the second RAT associated with a first mobile switching center (MSC) pool, the at least one designated location area identity including the identified location area of the second RAT associated with the first mobile switching center pool.

19. The apparatus of claim 17, in which the at least one designated location area identity comprises a prohibited location area and in which the at least one processor is further configured to identify a second mobile switching center pool adjacent to the first mobile switching center pool, in which the second mobile switching center pool does not support communication with the first mobile switching center pool.

20. The apparatus of claim 19, in which the at least one processor is further configured to identifying a location area of the second RAT associated with the second mobile switching center pool, the at least one designated location area identity including the location area of the second RAT associated with the second mobile switching center pool, the location area of the second RAT being the prohibited location area.

* * * * *